United States Patent
Ito et al.

(10) Patent No.: US 8,190,817 B2
(45) Date of Patent: May 29, 2012

(54) RAID CONTROL APPARATUS AND RAID SYSTEM

(75) Inventors: Mikio Ito, Kawasaki (JP); Hidejirou Daikokuya, Kawasaki (JP); Kazuhiko Ikeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 157 days.

(21) Appl. No.: 12/820,641

(22) Filed: Jun. 22, 2010

(65) Prior Publication Data
US 2010/0262775 A1   Oct. 14, 2010

Related U.S. Application Data

(63) Continuation of application No. PCT/JP2007/001486, filed on Dec. 27, 2007.

(51) Int. Cl.
*G06F 12/00* (2006.01)
(52) U.S. Cl. ...................................................... 711/114
(58) Field of Classification Search .................. None
See application file for complete search history.

(56) References Cited

U.S. PATENT DOCUMENTS

| 5,802,028 A | 9/1998 | Igarashi |
| 2003/0018851 A1 | 1/2003 | Ikeuchi et al. |
| 2003/0120674 A1 | 6/2003 | Morita et al. |
| 2004/0221102 A1 | 11/2004 | Watanabe |

FOREIGN PATENT DOCUMENTS

| JP | 8-147110 | 6/1996 |
| JP | 2001-143397 | 5/2001 |
| JP | 2003-29933 | 1/2003 |
| JP | 2003-241904 | 8/2003 |
| JP | 2005-11317 | 1/2005 |

OTHER PUBLICATIONS

International Search Report for PCT/JP2007/001486, mailed Apr. 8, 2008.

*Primary Examiner* — Brian Peugh
(74) *Attorney, Agent, or Firm* — Staas & Halsey LLP

(57) ABSTRACT

A RAID system performs host I/O processing during RAID formatting of a plurality of physical disk drives. The controller executes sequential format processing and one-point format processing. A RAID format writing size (SFS) for sequential format processing is set larger than a RAID format writing size (OFS) for one-point format processing. Delay of host I/O processing is reduced, so that the time required for RAID formatting can be shortened.

20 Claims, 15 Drawing Sheets

FIG. 3

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | | | | | | | 24 |
| 25 | | | | | | | 32 |
| ⋮ | | | | | | | ⋮ |
| 1+ (8XL-1) | | | | | | | 8XL |

| RAID Grp NUMBER | #1 |
|---|---|
| RAID Level | RAID5 |
| Strip | 65KB |
| Stripe Size | 130KB |
| MEMBER Disk NUMBER | 2 |
| MEMBER Disk | Disk#0, Disk#1, Disk#2 |

| MODEL NUMBER | ZONE NUMBER | TRACK SIZE | LOGICAL BLOCK ADDRESS |
|---|---|---|---|
| MAX3036FD | 0 | 650KB | 0x0000000 – 0x223F073 |
|  | 1 | 520KB | 0x223F074 – 0x447E0E7 |
| MAX3073FD | 0 | 650KB | 0x0000000 – 0x2DA95EF |
|  | 1 | 520KB | 0x2DA95F0 – 0x5B52BDF |
|  | 2 | 325KB | 0x5B52BE0 – 0x88FC1D0 |
| MAX3147FD | 0 | 650KB | 0x0000000 – 0x447E0E7 |
|  | 1 | 520KB | 0x447E0E8 – 0x88FC1CF |
|  | 2 | 325KB | 0x88FC1D0 – 0xCD7A2B7 |
|  | 3 | 260KB | 0xCD7A2B8 – 0x111F83A0 |
|  |  |  |  |

RAID CONTROL APPARATUS AND RAID SYSTEM

CROSS-REFERENCE TO RELATED APPLICATIONS

This application is a continuation of international application PCT/JP2007/001486, filed on Dec. 27, 2007, the entire contents of which are incorporated herein by reference.

FIELD

The present invention relates to a RAID control apparatus and a RAID system for performing processing to write RAID format on physical disk drives constituting a RAID, and more particularly to a RAID control apparatus and a RAID system for performing host I/O processing during RAID formatting.

BACKGROUND

In a case of a storage apparatus using such a storage media as a magnetic disk, a magneto-optical disk and an optical disk, the storage media is accessed based on a request by a data processing apparatus. In order to read/write the storage medium in a desired unit, it is necessary to format on the storage media.

This formatting can be physical formatting, such as CKD formatting, and a logical formatting which separates the data area in the processing units of the host OS (e.g. in block units) and provides identification. Because of this formatting of a storage media, the storage media can be accessed (e.g. read/write) using a host command of the host OS.

The physical format processing means the initialization processing for a media in track units, and the logical formatting means the format processing for the data area of physically formatted tracks in block units. For the logical format processing, it takes time to format (initialize) all the blocks for the media. Hence in order to actually use an unformatted media, the host must wait for the completion of format processing for a long time (e.g. over 30 minutes).

To solve this problem, a method for executing format processing of a storage media, not as an initialization processing, but in the background of processing a host I/O that is accepted, has been proposed (e.g. Patent Documents 1, 2 and 3).

According to Patent Document 1, for example, two types of methods are executed for this format processing (called "quick format processing"). The first format processing (called "one-point format processing") executes RAID formatting by host I/O processing when a host I/O, that includes an area where RAID formatting has not been completed, is received, and the second format processing (called "sequential format processing") sequentially executes RAID formatting from the beginning to the end of a RAID group.

FIG. 15 is a diagram depicting conventional one-point format processing. A RAID (Redundancy Array Independent Disk) device 200 connected to a host 100 has a channel adapter (CA) 202, a control module 204 and a plurality of physical disk drives 210, 212 and 214.

Here a configuration of RAID 5 (2+1), which is comprised of two data disk drives and one parity disk drive, is shown. The control module 204 receives an I/O request from the host 100 via a channel adapter 202. The control module 204 judges whether the range of this I/O request has been RAID-formatted or not. If the requested range has been RAID-formatted, the control module 204 continuously processes the I/O request (read or write) from the host.

If RAID-formatting has not be executed, on the other hand, the control module 204 executes RAID formatting with a stripe width (size) of each disk drive, then executes the I/O request. FIG. 15 shows a case of the physical disk drives 210 to 214, where formatted areas AF and unformatted areas UF coexist.

In FIG. 15, if the I/O request is a read request for data #5 of the physical disk 212, the storage stripe (area) of data #5 is an unformatted area UF, therefore format data Parity #2, Data #5 and Data #4, having the stripe widths of each disk drive 210, 212 and 214, are created respectively on the data buffer 208. And each of these data is written in areas having a same stripe number in each disk drive 210, 212 and 214. Thereby RAID formatting completes.

Then data #5 in the physical disk 212 is read and staged in the cache memory 206. The data #5 in the cache memory 206 is then transferred to the host via the channel adapter 202. In this way, the I/O request from the host is executed.

In the case of the sequential format method, on the other hand, RAID formatting is executed sequentially on the disk drives 210, 212 and 214, from the beginning to the end, according to the internal schedule, when an I/O request has not arrived for a predetermined time. If an I/O access is arrived in an area which has not yet been formatted by the sequential format processing, this area is formatted first for the I/O request. This method is called the "one-point format".

The time required for the RAID formatting is directly added to the I/O response time, so it is not a good idea to increase the size (area) of the RAID formatting. Hence conventionally the RAID format size of the one-point format and that of the sequential format are the same. And this size is set to a size with which the delay of the host I/O response does not increase to the extreme.

Patent Document 1: Japanese Patent Application Laid-Open No. 2003-29933
Patent Document 2: Japanese Patent Application Laid-Open No. 2003-241904
Patent Document 3: Japanese Patent Application Laid-Open No. 2005-11317

Recently the capacity of a disk drive is increasing because of the release of large capacity disk drives (e.g. 500 GByte or 750 GByte disk drives). If the above mentioned RAID format size is used for a RAID group constituted by such large capacity disk drives, a number of times of format writing processing per one disk drive increases. And this tends to increase the RAID formatting time.

If the RAID format size is increased to prevent this problem, delay of the host I/O response increases, which drops I/O processing performance.

SUMMARY

With the foregoing in view, it is an object of the present invention to provide a RAID control apparatus and a RAID system for preventing that the time required for RAID formatting is long, even if large capacity disk drives are used.

It is another object of the present invention to provide a RAID control apparatus and a RAID system for preventing that the time required for RAID formatting is long, while preventing a delay of the host I/O response.

It is still another object of the present invention to provide a RAID control apparatus and a RAID system for determining an appropriate RAID format size according to the capacity of the disk drive and RAID configuration.

To achieve these objects, a RAID control apparatus of the present invention, which receives and processes an I/O request from a host before completing the writing of a RAID format to a plurality of physical disk drives has: a channel adapter for controlling interface with the host; a control unit which, when an I/O request arrives from the host and a range requested by the I/O request has not been RAID-formatted, executes a one-point format processing to write the RAID format in an area of the physical disk drive that corresponds to the range requested by the I/O request, and a sequential format processing to write the RAID format sequentially from a first logical block address to a last logical block address in a RAID configuration constituted by the plurality of physical disk drives; and a device adapter which is connected to the plurality of physical disk drives and controls interface with the plurality of physical disk drives, and the control unit executes the sequential format processing by setting the RAID format size of one cycle of the sequential format processing to be larger than the RAID format size of the one-point format processing.

A RAID control system of the present invention, which receives and processes an I/O request from a host before completing the writing of a RAID format to a plurality of physical disk drives has: a plurality of physical disk drives; a channel adapter for controlling interface with the host; a control unit which, when an I/O request arrives from the host and a range requested by the I/O request has not been RAID-formatted, executes a one-point format processing to write the RAID format in an area of the physical disk drive that corresponds to the range requested by the I/O request, and a sequential format processing to write the RAID format sequentially from a first logical block address to a last logical block address in a RAID configuration constituted by the plurality of physical disk drives; and a device adapter which is connected to the plurality of physical disk drives and controls interface with the plurality of physical disk drives, and the control unit executes the sequential format processing by setting the RAID format size of one cycle of the sequential format processing to be larger than the RAID format size of the one-point format processing.

According to the present invention, it is preferable that the control unit inquires a capacity and a track size of the plurality of physical disk drives constituting the RAID, and determines the RAID format size of the one cycle of the sequential format processing based on the capacity and the track size.

According to the present invention, it is preferable that the control unit executes the sequential format processing by setting the RAID format size of one cycle of the sequential format processing to a capacity of one round of a track of the physical disk drive.

According to the present invention, it is preferable that the control unit judges whether the area RAID-formatted by the one-point format processing exists in an area specified by the RAID format size before starting one cycle of the sequential format processing, and when the area RAID-formatted by the one-point format processing exists in the area specified by the RAID format size of the one cycle of the sequential format processing, executes the sequential format processing after changing the RAID format size so as to cross over the area RAID-formatted by the one-point format processing.

According to the present invention, it is preferable that the control unit starts the sequential format processing after detecting that an I/O request from the host has not arrived for a predetermined time.

According to the present invention, it is preferable that the control unit has a RAID format management table for managing a progress state of the RAID formatting, and judges whether the area RAID-formatted by the one-point format processing exists in an area specified by the RAID format size with reference to the RAID format management table.

According to the present invention, it is preferable that the control unit has a pointer for storing a first area of the sequential format processing, and determines an area specified by the RAID format size in the sequential format processing with reference to the pointer.

According to the present invention, it is preferable that the control unit has a buffer which provides the RAID format at the sequential format processing, compares a RAID format size of the one cycle of the sequential format processing that is determined based on the capacity and the track size, with a capacity of the buffer, and sets a RAID format size that is smaller than the determined RAID format size when the RAID format size exceeds the capacity of the buffer.

According to the present invention, it is preferable that the control unit creates the RAID format pattern in a cache memory to execute the one-point format processing, and creates the RAID format pattern in a buffer to execute the sequential format processing.

According to the present invention, it is preferable that the control unit inquires a capacity and a track size of the plurality of physical disk drives constituting the RAID, and determines a RAID format size of the one cycle of the sequential format processing based on the RAID configuration, the capacity, and the track size.

Since the RAID format size SFS for the sequential format processing is set larger than the RAID format size OFS for the one-point format processing, delay of host I/O processing is reduced, so that the time required for RAID formatting can be shortened.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 3 shows the RAID format management table in FIG. 1;

FIG. 10 shows a RAID configuration table for the processing in FIG. 9;

FIG. 12 shows a physical track information table for the processing in FIG. 9;

DESCRIPTION OF EMBODIMENTS

Embodiments of the present invention will now be described in the sequence of RAID system, RAID format processing, I/O processing including format processing, sequential format processing, and other embodiments, but the present invention is not limited to these embodiments.

(Raid System)

Figure 1:
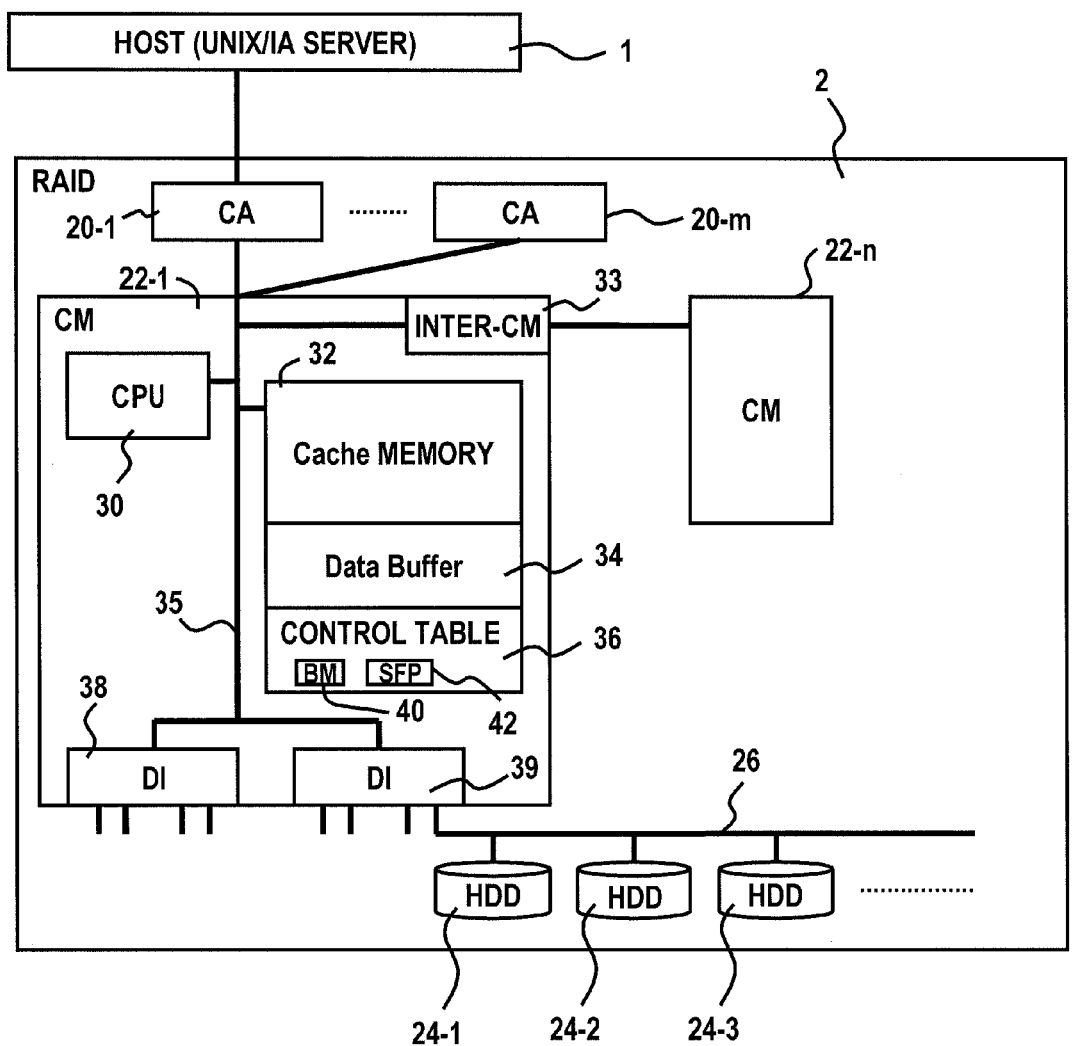
FIG. 1 is a diagram depicting a configuration of a RAID system according to an embodiment of the present invention.
Figure 2:
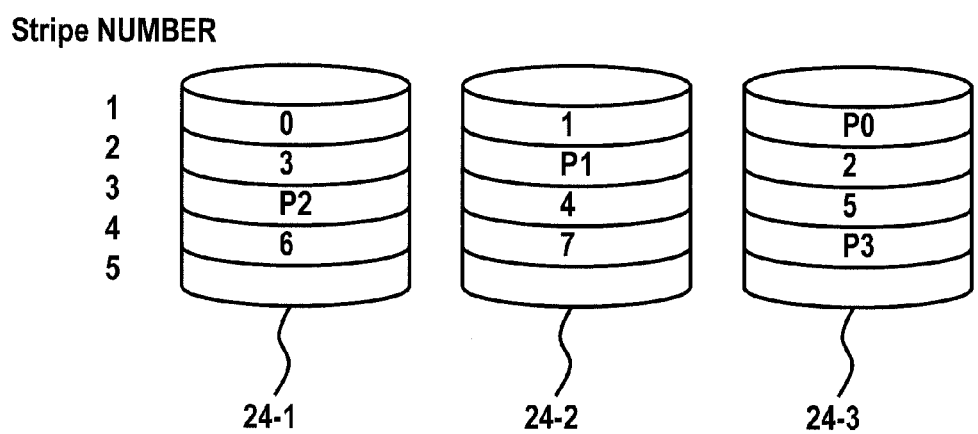
FIG. 2 is a diagram depicting stripes of the RAID configuration in FIG. 1.

FIG. 1 is a diagram depicting a configuration of a RAID system according to an embodiment of the present invention, FIG. 2 is a diagram depicting a stripe control of the RAID 5 in FIG. 1, and FIG. 3 indicates a RAID format management unit in FIG. 1.

As FIG. 1 indicates, a RAID system 2 is connected to a host 1, receives an I/O request from the host 1, and execute I/O processing. For the host 1, a UNIX(Registered Trademark) server or an IA (Internet Alliance) server, for example, can be used. An I/O request is a request to read or write data.

The RAID system 2 has a plurality of channel adapters 20-1 to 20-m, which control interface with the host 1, a plurality of control modules 22-1 to 22-n, and a plurality of disk drives (hard disk drives (HDD) in this case) 24-1, 24-2, 24-3 . . . .

Each control modules 20-1 to 20-n has a CPU (Central Processing Unit) 30, a cache memory 32, an inter-CM transfer circuit 33, a data buffer 34, a control table 36, a pair of device adapters 38 and 39, and an internal bus 35 which connects these components. The cache memory 32 stores a part of the data of the disk drives 24-1, 24-2, . . . , in advance, so that I/O processing can be performed for a host I/O, without accessing the disk drives.

The data buffer 34 is used as a work area of the CPU 30 for processing, and temporarily stores data. The control table 36 stores parameters for performing RAID control by the CPU 30. According to the present embodiment, The control table 36 stores a RAID format management table 40 for managing the progress state of the format processing and a sequential format pointer 42 for storing a next first stripe number in the sequential format processing.

The inter-CM transfer circuit 33 directly exchanges data between one control module 22-1 and another control module 22-n. The inter-CM transfer circuit 33 is used for mirroring of the cache memory and exchange of state information, for example.

Device adapters 38 and 39 are connected to each disk drive 24-1 to 24-n via a Fibre channel 26, and execute the exchange of command and data with each disk drive.

FIG. 2 is a diagram depicting the data configuration of RAID 5. Here the RAID 5 configuration, that is (2+1), is described. One data is divided into two data 1 and 2, and one parity data P0 is created for the two divided data 1 and 2. The two divided data 1 and 2 and the parity data P0 are distributed and stored in three disk drives 24-1 to 24-3. This storage position is denoted by a stripe number.

Data 0, for example, is stored in a position of the stripe number 1 of the disk drive 24-1, data 1 is stored in a position of the stripe number 1 of the disk drive 24-2, and the parity data P0 is stored in a position of the stripe number 1 of the disk drive 24-3. In the same manner, data 2 is stored in a position of the stripe number 2 of the disk drive 24-3, data 3 is stored in a position of the stripe number 2 of the disk drive 24-1, and the parity data P1 is stored in a position of the stripe number 2 of the disk drive 24-2.

FIG. 3 depicts the RAID format management table 40 in FIG. 1. As FIG. 3 shows, the management table 40 is a bit map type table, and each bit corresponds to a stripe number. A flag ("1") is set in a bit of a stripe number for which RAID format is completed. In FIG. 3, a corresponding stripe number is written in each bit of the bit map. The shaded portion is where RAID format is completed. In this example, sequential format processing has been completed for the stripe numbers 1 to 8, and RAID format by one-point format processing has been completed for a stripe number 13.

(Raid Format Processing)

Figure 4:
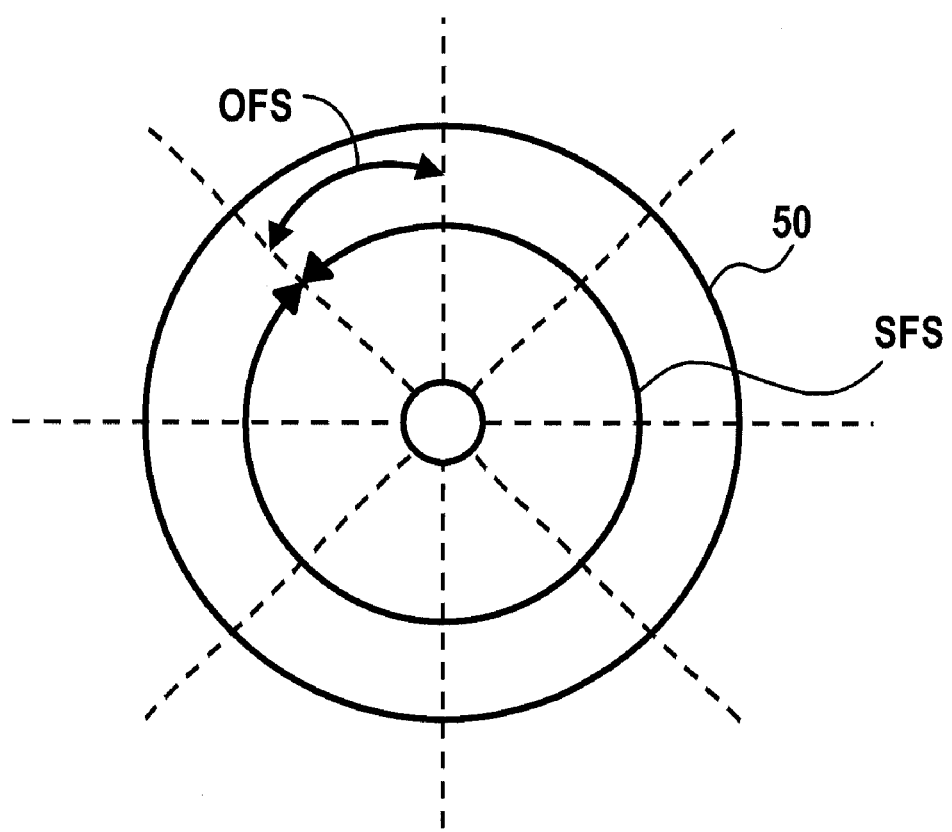
FIG. 4 is a diagram depicting the relationship of the RAID format size of the sequential format processing and the RAID format size of the one-point format processing in FIG. 1.
Figure 5:
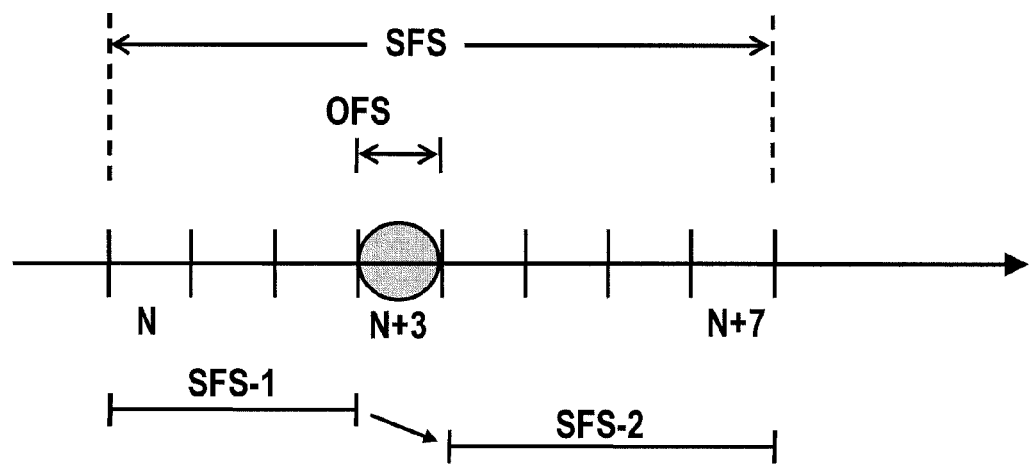
FIG. 5 is a diagram depicting the sequential format processing in relation to the RAID format size of the sequential format processing and the RAID format size of the one-point format processing in FIG. 4.
Figure 6:
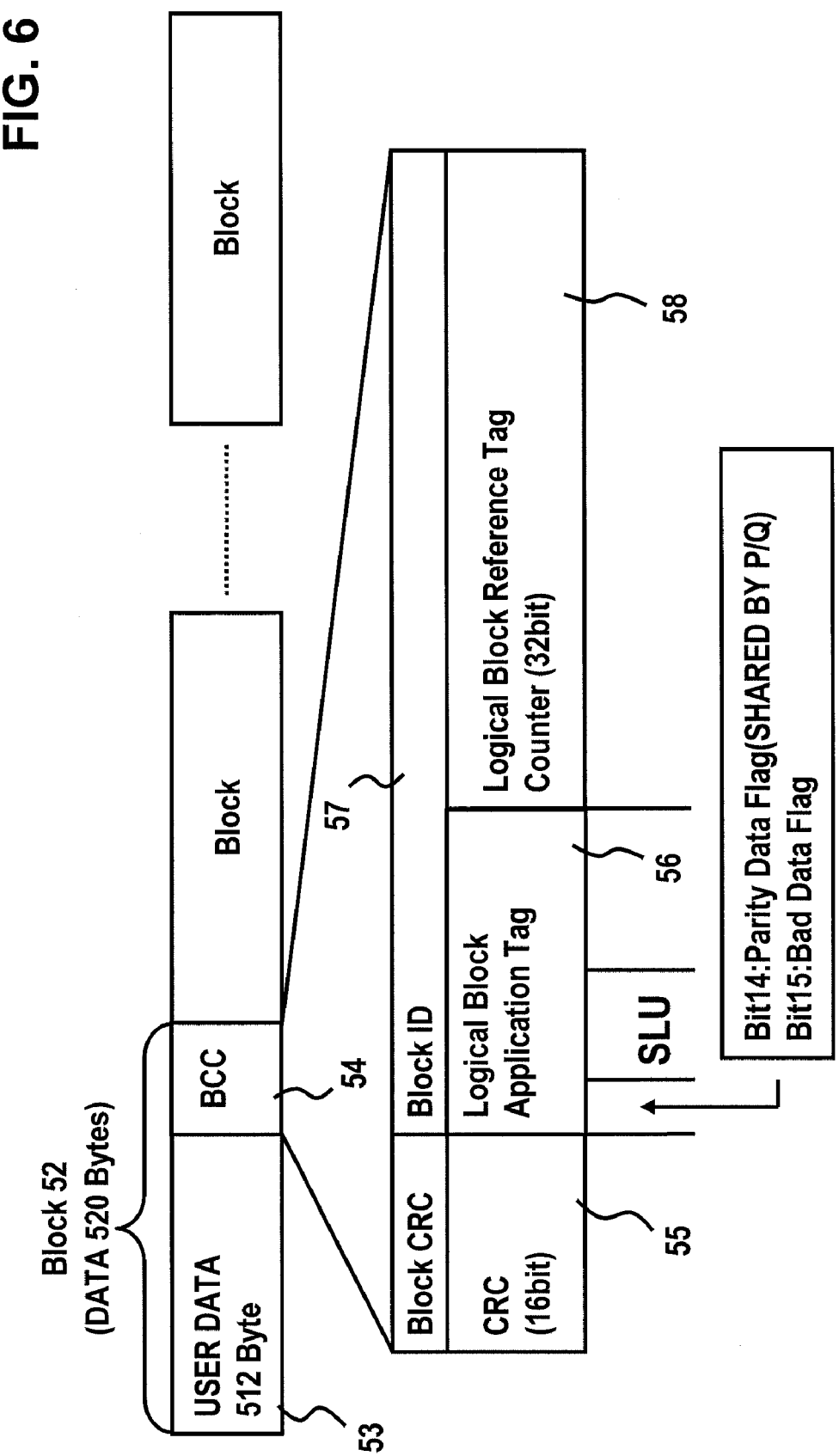
FIG. 6 is a diagram depicting the RAID format pattern in FIG. 1.

FIG. 4 is a diagram depicting a RAID format size according to an embodiment of the present invention, FIG. 5 is a diagram depicting the RAID format processing, and FIG. 6 is a diagram depicting the RAID format pattern.

As FIG. 4 depicts, according to the present invention, the RAID format size SFS on one surface of the magnetic disk 50 that is processed by the sequential format, and the RAID format size OFS thereof that is processed by the one-point format, are changed. In other words, the RAID format size SFS of the sequential format processing is set to be larger than the RAID format size OFS of the one-point format processing.

As mentioned above, the one-point format processing, which is executed at the timing of a host I/O, has a restriction not to prolong the delay of the host I/O processing, therefore the RAID format size OFS cannot be increased.

On the other hand, in the case of the sequential format processing which is executed when a host I/O does not arrive for a predetermined time, delay of the host I/O processing need not be given much consideration. Hence according to the present invention, the RAID format writing size SFS of the sequential format processing is set larger than the RAID format writing size OFS of the one-point format processing, so as to shorten the time required for quick formatting.

In a preferable example, the RAID format writing size (herein after describes as RAID format size) SFS of the sequential format processing is set the stripe width×n (n is an integer and n≧2), and the RAID format size OFS of the one-point format processing is set single the stripe width.

In terms of the performance of the disk, if one cycle of the sequential format processing is a processing of one round of a physical track of the disk 50, one round of the area on the disk can be formatted by one seek (access), which is appropriate for shortening time. A multiple is used because the size SFS can be set in a multiple of n, so as to correspond to one round on the disk. This is also because a value of n can be changed according to the relationship of the RAID configuration and resource management of the data buffer for an initialization pattern, as mentioned later.

For example, the size SFS of the sequential format processing should be determined based on the type of disk drives (manufacturer, generation, capacity, model number), RAID configuration (RAID level, number of member disks), and capacity of the initial pattern construction buffer (data buffer 34).

In FIG. 4, the RAID format size SFS of the sequential format processing is a size of one round of a physical track of the disk 50, and the RAID format size OFS of the one-point format processing is ⅛ round of the physical track.

As the RAID format pattern in FIG. 6 depicts, when one data block 52 has 520 Bytes, one data block 52 has the user data (512 Bytes) 53 and 8 Bytes BCC (Block Correction Code) section 54 for the user data block (512 Bytes) 53. This BCC section 54 has a CRC (Cyclic Redundancy Code) 55 of the block, and a block ID section 57 which has a logical block reference tag 58 which indicates an address of the block, and a logical block application tag 56. In this tag 56, the SLU (logical unit number) and the parity data for an entire block are recorded.

When the RAID formatting is performed, an initial pattern is created as this user data 53, and the BCC 54 is generated. And this block is prepared for the amount of the RAID format size. Then the RAID format data having the plurality of blocks is written on the disk.

When the processing sizes of the respective format processings are changed like this, an area N+3, formatted by the one-point format processing, may exist in the areas N to N+7 in the RAID format size SFS of the sequential format processing to be executed, as indicated by FIG. 5.

In such a case, if the above mentioned RAID format data is written in areas N to N+7 in the RAID format size SFS of the sequential format processing, the data in the area formatted by the one-point format processing is destroyed. To prevent this, the sequential format processing is divided into two steps. In other words, the sequential format processing is divided into a first sequential format processing SFS-1 for the RAID format size N to N+2, and a second sequential format processing SFS-2 for the RAID format size N+4 to N+7. Since the sequential format processing is performed so as to cross over the area N+3 formatted by the one-point format processing, damage of the data in the area formatted by the one-point format processing can be prevented.

(I/O Processing Including Format Processing)

Figure 7:
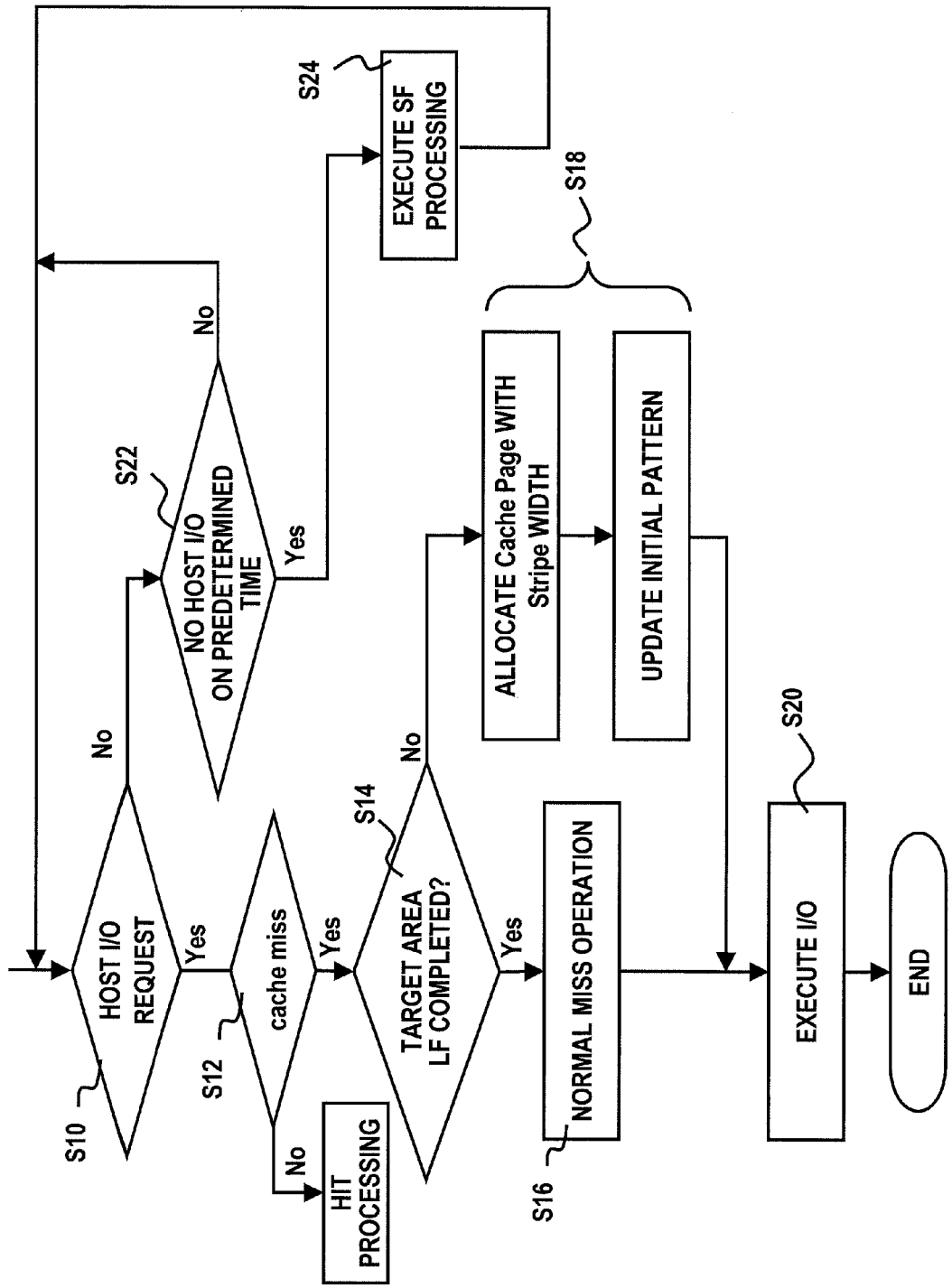
FIG. 7 is a flow chart depicting I/O processing including the format processing according to an embodiment of the present invention.
Figure 8:
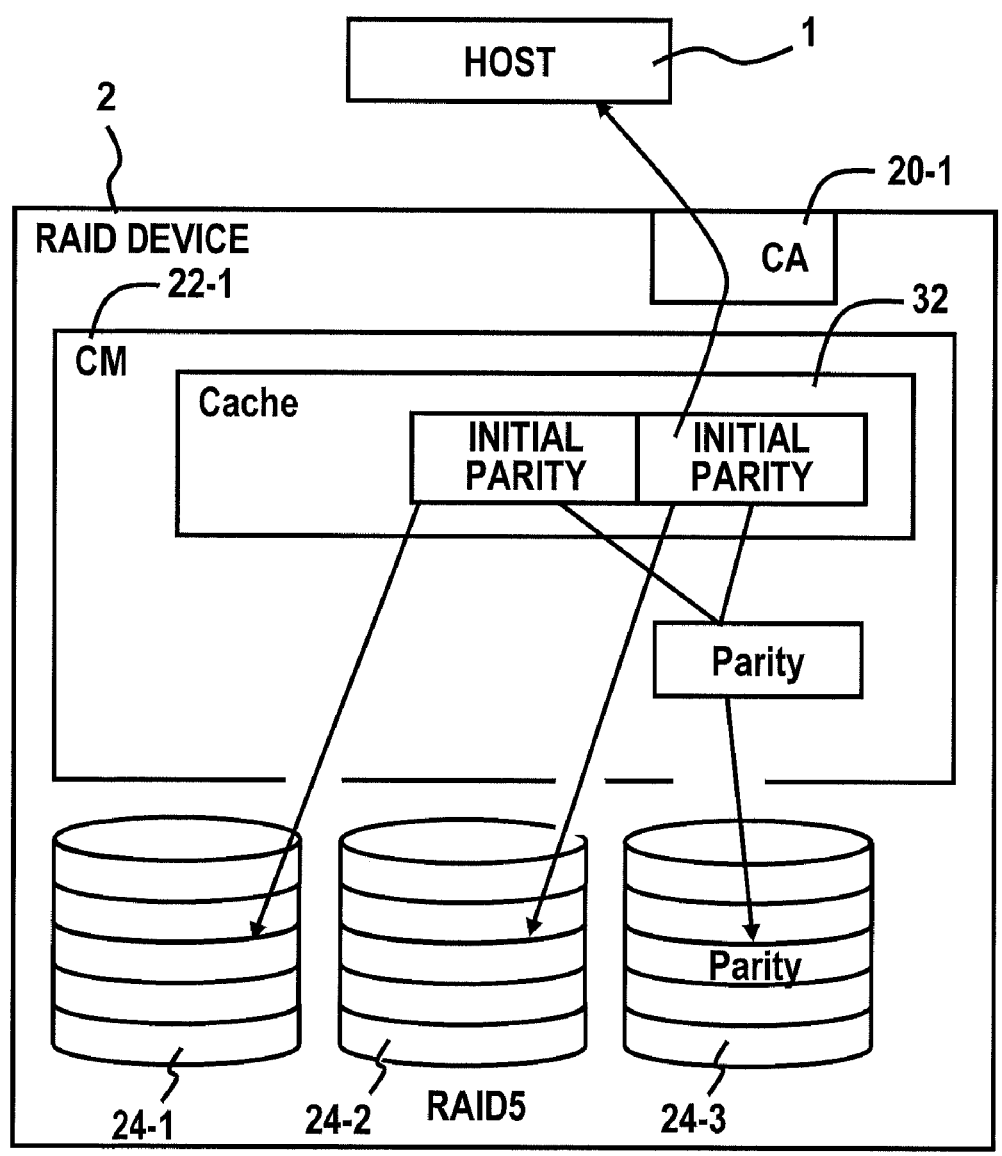
FIG. 8 is a diagram depicting the operation of the one-point format processing in FIG. 7.

FIG. 7 is a flow chart depicting the host I/O processing including the format processing, and FIG. 8 is a diagram depicting the one-point format processing for the RAID formatting as an extension of the host I/O processing.

(S10) The control module 22-1 judges whether or not the channel adapter 20-1 received a host I/O request.

(S12) When the control module judged that a host I/O request is received, the control module 22-1 judges whether or not the target data area of the host I/O exists in the cache memory 32 (Cache Hit/Miss). When Cache Hit, hit processing is performed. In other words, when the host I/O is read command, the requested data is transferred from the cache memory 32 to the host 1 via the channel adapter 20-1. When the host I/O is write command, on the other hand, the write data from the host 1 is stored in the target area of the cache memory 32.

(S14) When Cache Miss, the control module 22-1 judges whether or not RAID formatting has been completed in the requested range judged as Cache Miss. For this judgment, the RAID format management table 40 indicated by FIG. 1 and FIG. 3 is referred to.

(S16) When it is judged that the requested range is an area where RAID formatting has been completed, the control module 22-1 performs conventional miss processing. For example, if the I/O request is read or write, a storage area is allocated in the cache memory 32, the physical address on the disk is specified for this requested range, and a read or write command is issued to the disk drives 24-1 to 24-3.

(S18) If it is judged that the requested range is an area where the RAID formatting has not been completed, the control module 22-1 allocates an area in the cache memory 32 in the RAID stripe width units. This area is all handled as write data. As FIG. 8 depicts, the initialization pattern is written (updated) in the area of the RAID stripe width allocated in the cache memory 32. And response is returned to the host. This is an operation for connecting to the host, and transferring data after miss staging. And the processing for transferring data in a state where the initial pattern stored in the cache memory 32 is also the same.

(S20) The control module 22-1 executes I/O processing. In other words, if the host I/O is read command in the case of the miss operation in step S16, the control module 22-1 receives the read data from the disk drives 24-1 to 24-3, stores them in the cache memory 32, and transfers the requested data to the host 1 via the channel adapter 20-1. On the other hand, if the host I/O is write command, or in the case of one-point format processing in step S18, the control module 22-1 creates the parity in the write data and initialization data in the cache memory 32, and writes back the data in the disk drives 24-1 to 24-3 at the timing of output.

Here in the case of the one-point format processing, a response (initialization data if read, or write completion if write) is returned to the host 1 in the stage when the initialization data (RAID format) is created in the cache memory 32, so after the initialization data is created in the cache memory 32, RAID format can be written by write back, which is asynchronous with the host.

(S22) If it is judged that a host I/O request is not received in step S10, the control module 22-1 judges whether a host I/O has not been received continuously for a predetermined time. If it is judged that the time not receiving a host I/O has not reached the predetermined time, the control module 22-1 returns to step S10.

(S24) If it is judged that the time not receiving a host I/O has reached the predetermined time in step S22, the control module 22-1 executes the sequential processing, which will be described with reference to FIG. 9 and subsequent figures, and returns to step S10.

In other words, the one-point format processing on the extension of the host I/O processing is executed when the judgment result is Cache Miss and unformatted area. Then the cache memory 32 is allocated with the stripe width of the RAID group, is stored the RAID format pattern (initialization pattern) in the allocated area. And the host I/O processing is continued. Thereby the disk access of the RAID format processing is not accompanied with the host I/O, and can be processed at high-speed.

In the case of Cache Hit, the target area is already RAID formatted. In other words, RAID format completed/not completed is judged when the cache memory 32 is allocated, so this area can be regarded as RAID formatted area.

(Sequential Format Processing)

Figure 9:
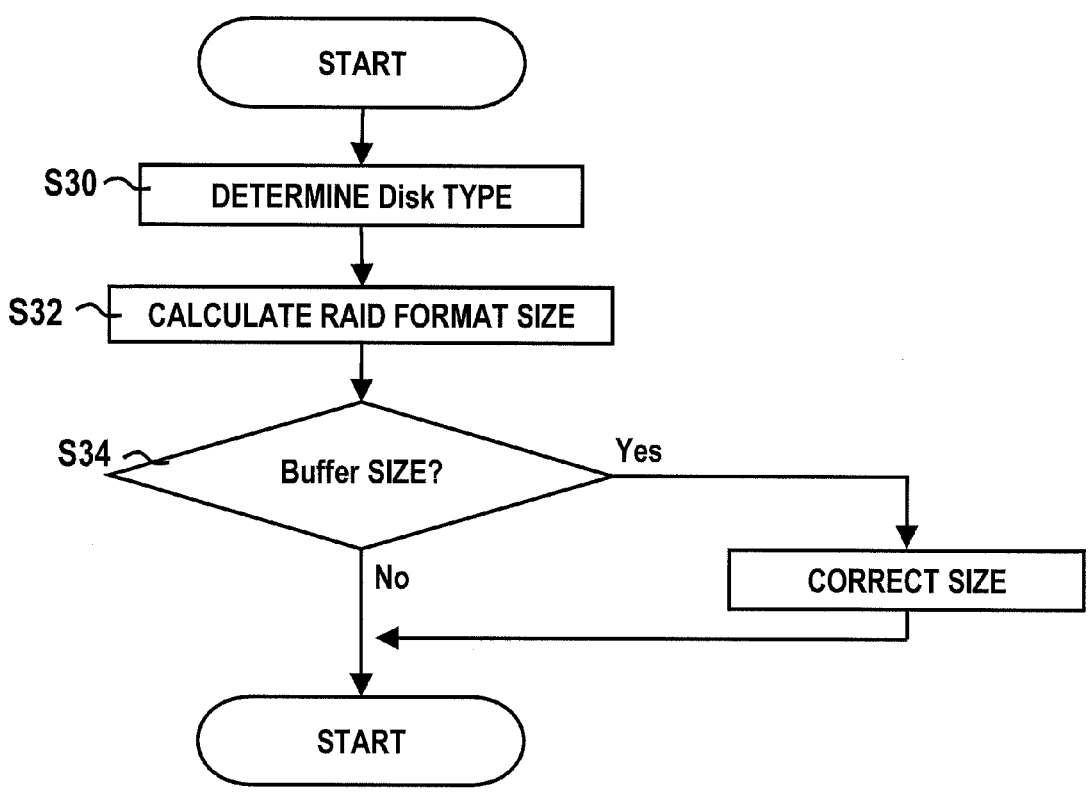
FIG. 9 is a flow chart depicting a RAID format size decision processing of the sequential format processing according to an embodiment of the present invention.
Figure 11:
FIG. 11 shows a disk information table for the processing in FIG. 9.

FIG. 9 is a flow chart depicting a size decision processing of the sequential format processing according to an embodiment of the present invention, and FIG. 10 to FIG. 12 are tables to describe this processing.

FIG. 9 is a flow chart depicting the size decision processing which is performed initially in the sequential format processing.

(S30) When the disk drives 24-1 to 24-3 are connected to the RAID device, the control module 22-1 inquires disk information to each disk drive 24-1 to 24-3 by the next SCSI (Small Component System Interface) command, and stores the disk information in the control table 36. As depicted by FIG. 11, the type of disk can be specified by this disk information table. For example, the manufacturer of the disk drive and the disk model number are inquired by the INQUIRY command of SCSI, the rotation frequency of the disk is inquired by the MODE SENSE command of SCSI, and the capacity of the disk is inquired by the READ CAPACITY command of SCSI.

(S32) Then the control module 22-1 calculates the RAID format size SFS. First the type of the disk constituting the RAID group is specified in the RAID configuration table indicated in FIG. 10, then a size that corresponds to one round of the physical track of the disk is determined. Then the RAID format size SFS is calculated based on the RAID configuration.

(S34) Here the calculated RAID format size SFS and the size of the initialization pattern data buffer 34 are compared. If the RAID format size SFS exceeds the size of the initialization pattern data buffer 34, the size is corrected.

The above size determination process will be described in concrete terms with reference to FIG. 10 to FIG. 12.

It is assumed that the RAID configuration table 44-1 in FIG. 10 is provided in advance, and it is assumed that the disk information table 44-2 in FIG. 11 and the physical track information table 44-3 in FIG. 12 have been created in step S30.

First a target disk drive type is specified in the RAID configuration of the RAID configuration table 44-1 in FIG. 10. In other words, the disk drive Disk #0 is determined to be "MAX3147FD" made by FJ (FUJITSU), with reference to the disk information table 44-2 in FIG. 11 from Disk #0 which is stored in the member disk column of the RAID configuration table 44-1.

The zone number of the RAID format start logical block address LBA (0x447E0E8) is searched in the physical track information table 44-3. In FIG. 12, the logical block address is included in the zone number #1, so the physical track size is 520 KBytes (track size).

Then the RAID format size is calculated in step S32. In other words, the RAID format size (number of execution stripes) per disk drive is determined. Here it is also necessary that the result is rounded to be within the stripe size boundary of the RAID group. Since the strip width is 65 KBytes according to the RAID configuration table 44-1 and the track size is 520 KBytes according to the physical track information table 44-3, the number of execution stripes (RAID format size) is calculated by the following Expression (1).

Number of execution stripes=physical track size/
Strip=520 KB/65 KB=8(no remainder) (1)

If there is a remainder in the result of Expression (1), "1" is added to the calculated number of execution stripes. In other words, this additional stripe is executed this time, instead of the next time, but the difference is not major. Then the RAID format size (KByte) is calculated by the following Expression (2), based on the number of member disk drives (2+1 in this case) constituting the RAID configuration, the calculated number of execution stripes and the strip width.

RAID format size=RAID format size per disk drive×
number of member disks=number of execution
stripes×stripx×number of member disks=8×65
KB×(2+1)=1560 KBytes (2)

Further, this RAID format is compared with the provided buffer size. If the calculated RAID format size exceeds the initialization pattern data buffer size (e.g. 64 MBytes), the RAID format size is changed. In this example, the data buffer size can establish the following Expression (3), so the RAID format size is not changed.

RAID format size<initialization pattern data buffer
size=1560 KB<64 MB (3)

On the other hand, if (RAID format size>initialization pattern data buffer size) is established in Expression (3), the number of execution stripes is decreased so as to satisfy the condition of Expression (3).

The RAID format size, when the one-point format processing is executed, is set to stripe width×1. This is because the delay of the host I/O processing is minimized by minimizing the RAID format size. In other words, in the case of RAID 5/6, parity data must be generated from the data of the initial patterns, so the delay can be minimized more as the format size becomes smaller.

Figure 13:
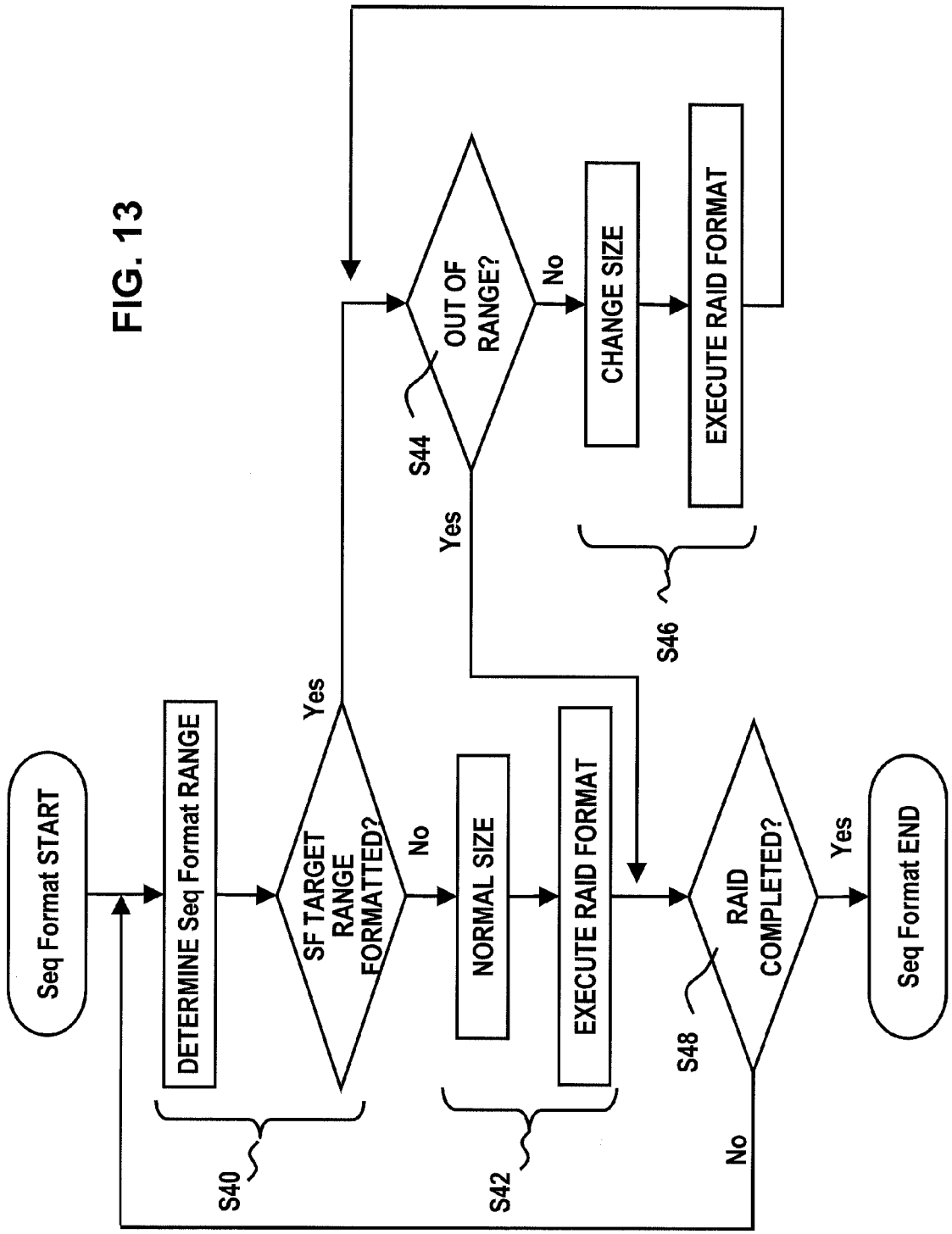
FIG. 13 is a flow chart depicting the sequential format processing in FIG. 7.
Figure 14:
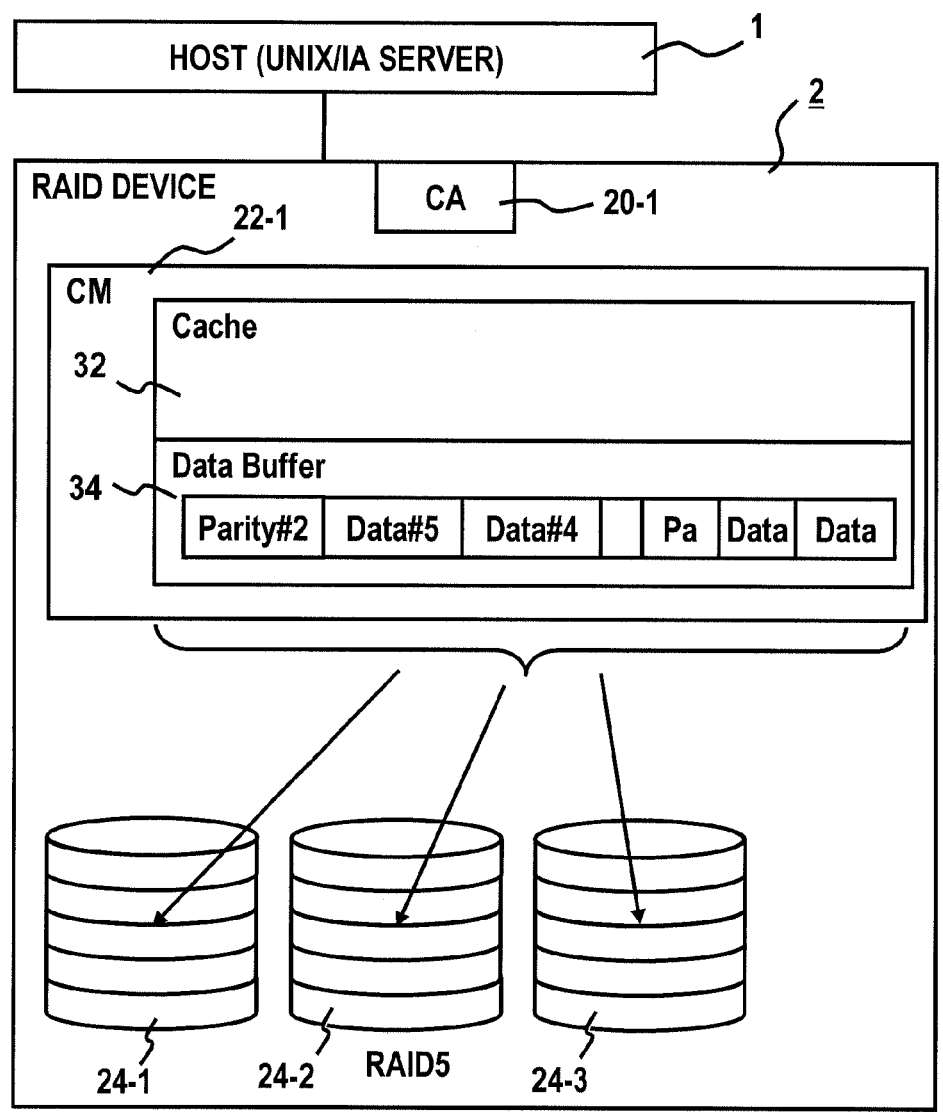
FIG. 14 is a diagram depicting the operation of the sequential format processing in FIG. 13.
Figure 15:
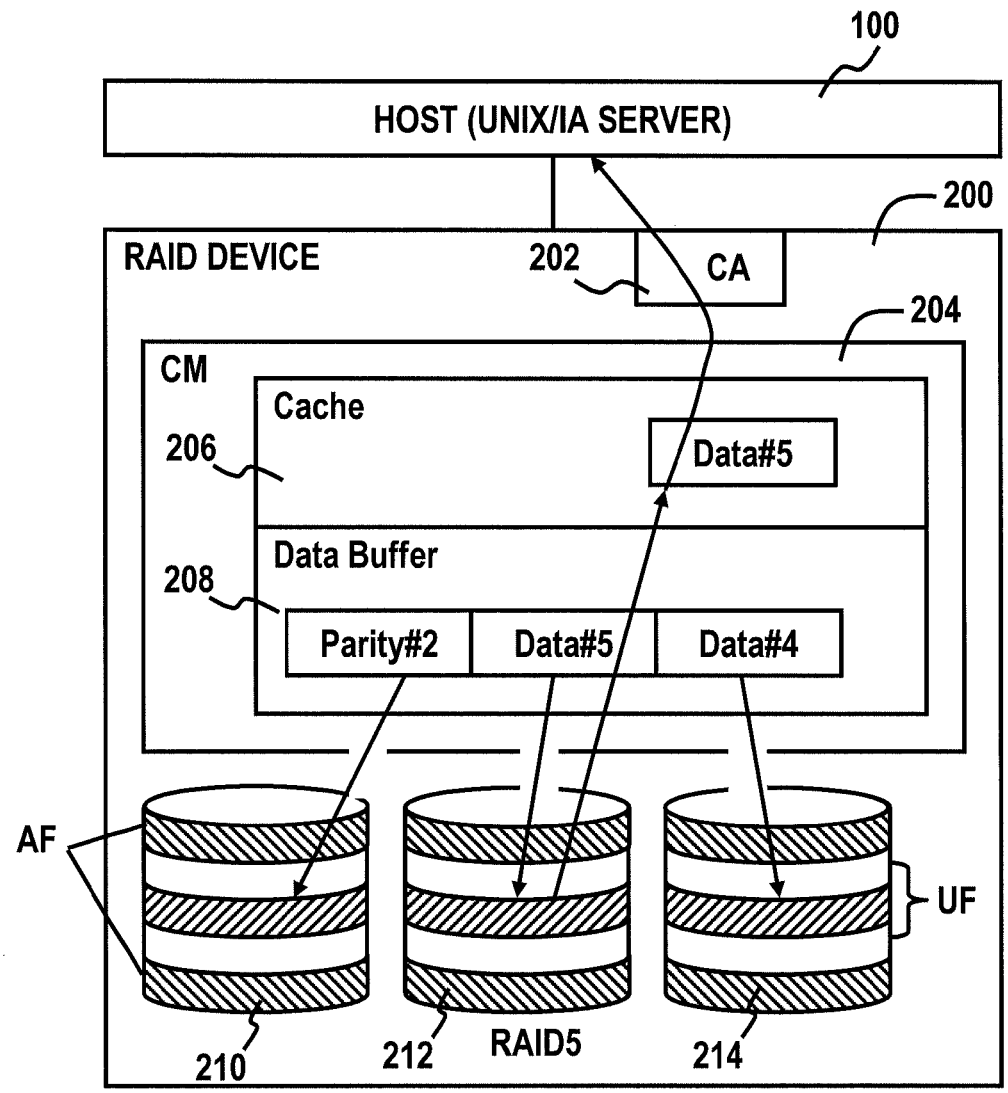
FIG. 15 is a diagram depicting a conventional RAID format processing.

FIG. 13 is a flow chart depicting the sequential format processing, and FIG. 14 is a diagram depicting the sequential format processing. The processing in FIG. 13 will now be described with reference to FIG. 14.

(S40) In the sequential format processing, RAID formatting is performed sequentially from the first LBA to the last LBA in the RAID group when the RAID group is created. First the RAID formatting range this time (range of 8 stripe numbers from the first stripe number in this example) is determined with reference to the sequential format pointer 42 which indicates the first stripe number of the next time, described in FIG. 1. Then in order to judge whether this area has been formatted or not when RAID formatting is executed, the control module 22-1 refers to the RAID format management table 40 (see FIG. 3), and judges whether a formatted area exists in the determined range.

(S42) If it is judged that no formatted area exists in the determined range, the control module 22-1 creates the initial data in the normal size (that is, 8 stripe width) and the parity data in the data buffer 34 (see FIG. 14), writes the 8 stripes of the RAID formatted data (see FIG. 6) in each disk drive 24-1 to 24-3, and executes the RAID format.

(S44) If it is judged that a formatted area exists in the determined range, on the other hand, the control module 22-1 judges whether RAID formatting is completed in the determined range. If it is judged that RAID formatting is completed in the determined range, the control module 22-1 advances to step S48.

(S46) On the other hand, if it is judged that RAID formatting is not completed in the determined range, the control module 22-1 skips the RAID formatted area by one-point format, detected in step S40, as described in FIG. 5, and changes the RAID format size, and executes RAID formatting again. Then processing returns to step S44.

(S48) Then it is judged whether or not RAID formatting is completed (RAID formatting is completed up to the last LBA) based on the value of the above mentioned sequential format pointer 42. If not completed, the pointer 42 is incremented by "8" stripes, and processing returns to step S10 in FIG. 7, and if it is judged that a host I/O request has not been received for a predetermined time in step S22, processing is started from step S40. If completed, on the other hand, the sequential format processing ends.

Other Embodiments

In the above embodiments, the disk storage device was described using an example of a magnetic disk drive, but the present invention can also be applied to other disk drives, such as optical disk drives, or to a device using a rotating storage media. The RAID configuration is not limited to RAID 5, but may be RAID 0, 1, 2, 6 or the like. When the data buffer size is large, judgment in S34 in FIG. 9 is unnecessary.

The present invention was described above using the embodiments, but the present invention can be modified in various ways within the scope of the spirit thereof, and these variant forms should not be excluded from the scope of the present invention.

Since the RAID format size SFS for the sequential format processing is set larger than the RAID format size OFS of the one-point format processing, delay of host I/O processing is reduced, so that the time required for RAID formatting can be shortened.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A RAID control apparatus which receives and processes an I/O request from a host before completing the writing of a RAID format pattern to a plurality of physical disk drives, comprising:
    a channel adapter for controlling interface with the host;
    a control unit which, when an I/O request arrives from the host and a range requested by the I/O request has not been RAID-formatted, executes a one-point format processing to write the RAID format pattern in an area of the physical disk drive that corresponds to the range requested by the I/O request, and a sequential format processing to write the RAID format pattern sequentially from a first logical block address to a last logical block address in a RAID configuration constituted by the plurality of physical disk drives; and
    a device adapter which is connected to the plurality of physical disk drives and controls interface with the plurality of physical disk drives,
    wherein the control unit executes the sequential format processing by setting a RAID format writing size of one cycle of the sequential format processing to be larger than the RAID format writing size of the one-point format processing.

2. The RAID control apparatus according to claim 1, wherein the control unit inquires a capacity and a track size of the plurality of physical disk drives constituting the RAID, and determines the RAID format writing size of the one cycle of the sequential format processing based on the capacity and the track size.

3. The RAID control apparatus according to claim 2, wherein the control unit executes the sequential format processing by setting the RAID format writing size of one cycle of the sequential format processing to a capacity of one round of a track of the physical disk drive.

4. The RAID control apparatus according to claim 2, wherein the control unit has a buffer which stores RAID format pattern when the sequential format processing, and
    The control unit compares a RAID format writing size of the one cycle of the sequential format processing that is determined based on the capacity and the track size, with a capacity of the buffer, and sets a RAID format writing size that is smaller than the determined RAID format writing size when the RAID format writing size exceeds the capacity of the buffer.

5. The RAID control apparatus according to claim 2, wherein the control unit inquires a capacity and a track size of the plurality of physical disk drives constituting the RAID, and determines the RAID format writing size of the one cycle of the sequential format processing based on the RAID configuration, the capacity, and the track size.

6. The RAID control apparatus according to claim 1, wherein the control unit judges whether or not the area RAID-formatted by the one-point format processing exists in an area specified by the RAID format writing size before starting one cycle of the sequential format processing, and when the area RAID-formatted by the one-point format processing exists in the area specified by the RAID format size of the one cycle of the sequential format processing, executes the sequential format processing after changing the RAID format writing size so as to cross over the area RAID-formatted by the one-point format processing.

7. The RAID control apparatus according to claim 6, wherein the control unit has a RAID format management table for managing a progress state of the RAID formatting,
    and the control unit judges whether or not the area RAID-formatted by the one-point format processing exists in an area specified by the RAID format size with reference to the RAID format management table.

8. The RAID control apparatus according to claim 1, wherein the control unit starts the sequential format processing after detecting that an I/O request from the host has not arrived for a predetermined time.

9. The RAID control apparatus according to claim 1, wherein the control unit has a pointer for storing a first area of the sequential format processing, and
    The control unit determines an area specified by the RAID format writing size in the sequential format processing with reference to the pointer.

10. The RAID control apparatus according to claim 1, wherein the control unit creates RAID format pattern in a cache memory, executes the one-point format processing, and creates the RAID format pattern in a buffer and executes the sequential format processing.

11. A RAID system which receives and processes an I/O request from a host before completing the writing of a RAID format pattern to a plurality of physical disk drives, comprising:
    the plurality of physical disk drives;
    a channel adapter for controlling interface with the host;
    a control unit which, when an I/O request arrives from the host and a range requested by the I/O request has not been RAID-formatted, executes a one-point format processing to write the RAID format pattern in an area of the physical disk drive that corresponds to the range requested by the I/O request, and a sequential format processing to write the RAID format pattern sequentially from a first logical block address to a last logical block address in a RAID configuration constituted by the plurality of physical disk drives; and
    a device adapter which is connected to the plurality of physical disk drives and controls interface with the plurality of physical disk drives,
    wherein the control unit executes the sequential format processing by setting RAID format writing size of one cycle of the sequential format processing to be larger than the RAID format writing size of the one-point format processing.

12. The RAID system according to claim 11, wherein the control unit inquires a capacity and a track size of the plurality of physical disk drives constituting the RAID, and determines the RAID format writing size of the one cycle of the sequential format processing based on the capacity and the track size.

13. The RAID system according to claim 12, wherein the control unit executes the sequential format processing by setting the RAID format writing size of one cycle of the sequential format processing to a capacity of one round of a track of the physical disk drive.

14. The RAID system according to claim 12, wherein the control unit has a buffer which stores the RAID format pattern when the sequential format processing, and the control unit compares a RAID format writing size of the one cycle of the sequential format processing that is determined based on the capacity and the track size, with a capacity of the buffer, and sets a RAID format writing size that is smaller than the determined RAID format writing size when the RAID format writing size exceeds the capacity of the buffer.

15. The RAID system according to claim 12, wherein the control unit inquires a capacity and a track size of the plurality of physical disk drives constituting the RAID, and the control unit determines a RAID format writing size of the one cycle of the sequential format processing based on the RAID configuration, the capacity, and the track size.

16. The RAID system according to claim 11, wherein the control unit judges whether or not the area RAID-formatted by the one-point format processing exists in an area specified by the RAID format size before starting one cycle of the sequential format processing, and when the area RAID-formatted by the one-point format processing exists in the area specified by the RAID format size of the one cycle of the sequential format processing, executes the sequential format processing after changing the RAID format writing size so as to cross over the area RAID-formatted by the one-point format processing.

17. The RAID system according to claim 16, wherein the control unit has a RAID format management table for managing a progress state of the RAID formatting, and the control unit judges whether or not the area RAID-formatted by the one-point format processing exists in an area specified by the RAID format writing size with reference to the RAID format management table.

18. The RAID system according to claim 11, wherein the control unit starts the sequential format processing after detecting that an I/O request from the host has not arrived for a predetermined time.

19. The RAID system according to claim 11, wherein the control unit has a point for storing a first area of the sequential format processing, and the control unit determines an area specified by the RAID format writing size in the sequential format processing with reference to the pointer.

20. The RAID system according to claim 11, wherein the control unit creates the RAID format pattern in a cache memory, executes the one-point format processing, and creates the RAID format pattern in a buffer and execute the sequential format processing.

\* \* \* \* \*